US012674569B1

(12) United States Patent
Yang et al.

(10) Patent No.: US 12,674,569 B1
(45) Date of Patent: Jul. 7, 2026

(54) FOLDING LAMP

(71) Applicant: LONGHORN INTELLIGENT TECH CO., LTD, Shenzhen (CN)

(72) Inventors: Haitao Yang, Shenzhen (CN); Feng Zhu, Shenzhen (CN); Xingwei Huang, Shenzhen (CN); Shijun Yang, Shenzhen (CN)

(73) Assignee: LONGHORN INTELLIGENT TECH CO., LTD, Shenzhen (CN)

( * ) Notice: Subject to any disclaimer, the term of this patent is extended or adjusted under 35 U.S.C. 154(b) by 0 days.

(21) Appl. No.: 19/242,767

(22) Filed: Jun. 18, 2025

(51) Int. Cl.

| | |
|---|---|
| ***F21V 23/06*** | (2006.01) |
| ***F21S 4/20*** | (2016.01) |
| ***F21V 21/108*** | (2006.01) |
| ***F21V 21/26*** | (2006.01) |
| ***F21V 31/00*** | (2006.01) |
| *F21Y 115/10* | (2016.01) |

(52) U.S. Cl.
CPC ................ *F21V 23/06* (2013.01); *F21S 4/20* (2016.01); *F21V 21/108* (2013.01); *F21V 21/26* (2013.01); *F21V 31/005* (2013.01); *F21Y 2115/10* (2016.08)

(58) Field of Classification Search
CPC ....................................................... F21V 23/06
See application file for complete search history.

(56) References Cited

U.S. PATENT DOCUMENTS

| | | | | |
|---|---|---|---|---|
| 4,454,569 | A * | 6/1984 | Maguire | F21V 17/02 362/287 |
| 7,097,327 | B1 * | 8/2006 | Barton | F21V 19/0085 439/372 |
| 7,175,300 | B1 * | 2/2007 | Medeiros | F21V 19/008 362/648 |
| 10,842,082 | B1 * | 11/2020 | Genga, Jr. | A01G 9/249 |
| 2012/0140473 | A1 * | 6/2012 | Chang | F21V 21/30 362/249.03 |
| 2018/0080640 | A1 * | 3/2018 | Way | G09F 3/04 |
| 2018/0087755 | A1 * | 3/2018 | Yorio | F21V 17/007 |
| 2020/0041109 | A1 * | 2/2020 | Van Der Schyf | E05D 3/02 |
| 2022/0146061 | A1 * | 5/2022 | Koivisto | H10H 20/8582 |
| 2024/0035649 | A1 * | 2/2024 | Wang | A01G 9/249 |
| 2024/0060608 | A1 * | 2/2024 | Lu | F21S 4/28 |
| 2024/0401787 | A1 * | 12/2024 | Qiu | F21V 21/145 |
| 2025/0129922 | A1 * | 4/2025 | O'Connor | F21V 21/26 |

FOREIGN PATENT DOCUMENTS

| | | | | |
|---|---|---|---|---|
| CN | 115875646 A | * | 3/2023 | F21S 4/28 |

* cited by examiner

*Primary Examiner* — Zheng Song
(74) *Attorney, Agent, or Firm* — Clement Cheng

(57) ABSTRACT

A folding lamp has a primary frame member extending along a longitudinal axis. Multiple socket arms are attached to opposite sides of the primary frame member using electrical pivot joints. Each socket arm pivots between a folded position parallel to the primary frame member and an unfolded position perpendicular to it. Long lighting strips can be attached between pairs of socket arms when they are unfolded. Each socket arm has at least one socket that can receive the end of a lighting strip. Each socket includes an electrical connector that supplies power to its lighting strip.

18 Claims, 6 Drawing Sheets

FOLDING LAMP

FIELD OF THE INVENTION

The present invention is in the field of lighting.

DISCUSSION OF RELATED ART

A variety of different folding lamps have been created in the prior art. A variety of folding and collapsible lamps have been developed in the prior art. For example, U.S. Pat. No. 4,422,132 (Charles A. Trowbridge; filed Dec. 14, 1981), titled "Fluorescent-type fixture having improved fold-out lamp socket assemblies," discloses a fluorescent lighting fixture with socket assemblies pivoting outward from a channel housing for installation. U.S. Pat. No. 4,595,970 (Don M. Miletich; filed Jun. 8, 1984) describes a lamp with a folding support structure for use with a reclining chair. U.S. Pat. No. 5,205,645 (Jin T. Lee; filed Feb. 3, 1992), titled "Halogen flood light with a foldaway stand," provides a portable halogen work light with a collapsible, U-shaped foldable stand. U.S. Pat. No. 6,030,094 (John A. Sedovic et al.; filed May 1, 1998), titled "Collapsible lantern with automatic shut-off feature," describes a battery-powered lantern that collapses and automatically disconnects power when collapsed. U.S. Pat. No. 11,598,516 (Haitao Yang et al.; filed Feb. 18, 2022), titled "Folding grow light," discloses an LED lighting device with multiple linear light bars on folding arms. These references show various folding lamp structures.

SUMMARY OF THE INVENTION

A folding lamp has a primary frame member extending along a longitudinal axis. Multiple socket arms are attached to opposite sides of the primary frame member using electrical pivot joints. Each socket arm pivots between a folded position parallel to the primary frame member and an unfolded position perpendicular to it. Long lighting strips can be attached between pairs of socket arms when they are unfolded. Each socket arm has at least one socket that can receive the end of a lighting strip. Each socket includes an electrical connector that supplies power to its lighting strip. The electrical pivot joints maintain electrical connections when pivoting, providing power from the primary frame to each lighting strip through the socket arms. Each socket arm is waterproof and coated with silicone. Each lighting strip includes LEDs sealed inside a transparent waterproof lens. Each socket has a recess to receive and secure the lighting strip end with a latch mechanism. The latch mechanism has a hinged latch and a spring-biased latch locker engaging a slot to secure the latch without tools. Each socket arm has a longitudinal connector rail for adjusting socket positions along it. A connector post on each socket slides within the rail for positional adjustments. Each connector post has a base that frictionally engages the connector rail to secure socket positioning. The electrical pivot joint includes a shaft core, retainer bracket, movable bracket, and tightening elements assembled coaxially around a rotation axis. The tightening elements include spring washers to maintain a biased electrical and mechanical connection. A shaft sleeve between the retainer and movable brackets provides a gasket seal. A limit washer defines a rotation limit for the movable bracket relative to the retainer bracket. Each socket's electrical connector includes a spring-biased pin connector receiver. Lighting strips are oriented horizontally when the lamp is unfolded. When unfolded, the socket arms form an H-shaped configuration. Each lighting strip end has an end cap with a connector socket that receives a connector post from the socket. Assembly and disassembly of the lamp do not require tools. The lighting strips and socket arms are mainly made from aluminum extrusions for durability and lightweight construction. The socket electrical connectors are covered and oriented upward to enhance waterproofing. The socket arms pivot upward from the folded position adjacent to the primary frame to the unfolded position.

The following call out list of elements can be a useful guide in referencing the element numbers of the drawings.

20 Folding Frame
21 Primary Frame Member
22 First Left Socket Arm
23 Second Left Socket Arm
24 First Right Socket Arm
25 Second Right Socket Arm
26 First Left Socket Arm Joint
27 Second Left Socket Arm Joint
28 First Right Socket Arm Joint
29 Second Right Socket Arm Joint
30 Socket
31 First Left Distal Socket
32 First Left Middle Socket
33 First Left Proximal Socket
34 Second Left Distal Socket
35 Second Left Middle Socket
36 Second Left Proximal Socket
41 First Right Distal Socket
42 First Right Middle Socket
43 First Right Proximal Socket
44 Second Right Distal Socket
45 Second Right Middle Socket
46 Second Right Proximal Socket
50 Axis Of Rotation
51 Shaft Core
52 Retainer Bracket
53 Shaft Sleeve
54 Limit Washer
55 Movable Bracket
56 Tightening Washer
57 Spring Washer
58 Nut
59 Electrical Joint
61 First Distal Lighting Strip
62 First Middle Lighting Strip
63 First Proximal Lighting Strip
64 Second Distal Lighting Strip
65 Second Middle Lighting Strip
66 Second Proximal Lighting Strip
70 Socket Arm
71 Lighting Strip
72 LED
73 Lens
74 Socket Recess

75 Latch
76 Latch Hinge
77 Latch Locker
78 Latch Locker Spring
79 Socket Electrical Connector
80 Socket Pin Connector Receiver
81 Connector Post
82 Lighting Strip Socket Connection End Cap
83 Led Strip
84 Electrical Wiring
85 Socket Arm Channel
86 Connector Post Receiving Socket
87 Connector Post Base
88 Connector Post Base Rail
99 Latch Locker Slot

DETAILED DESCRIPTION OF THE PREFERRED EMBODIMENT

Figure 1:
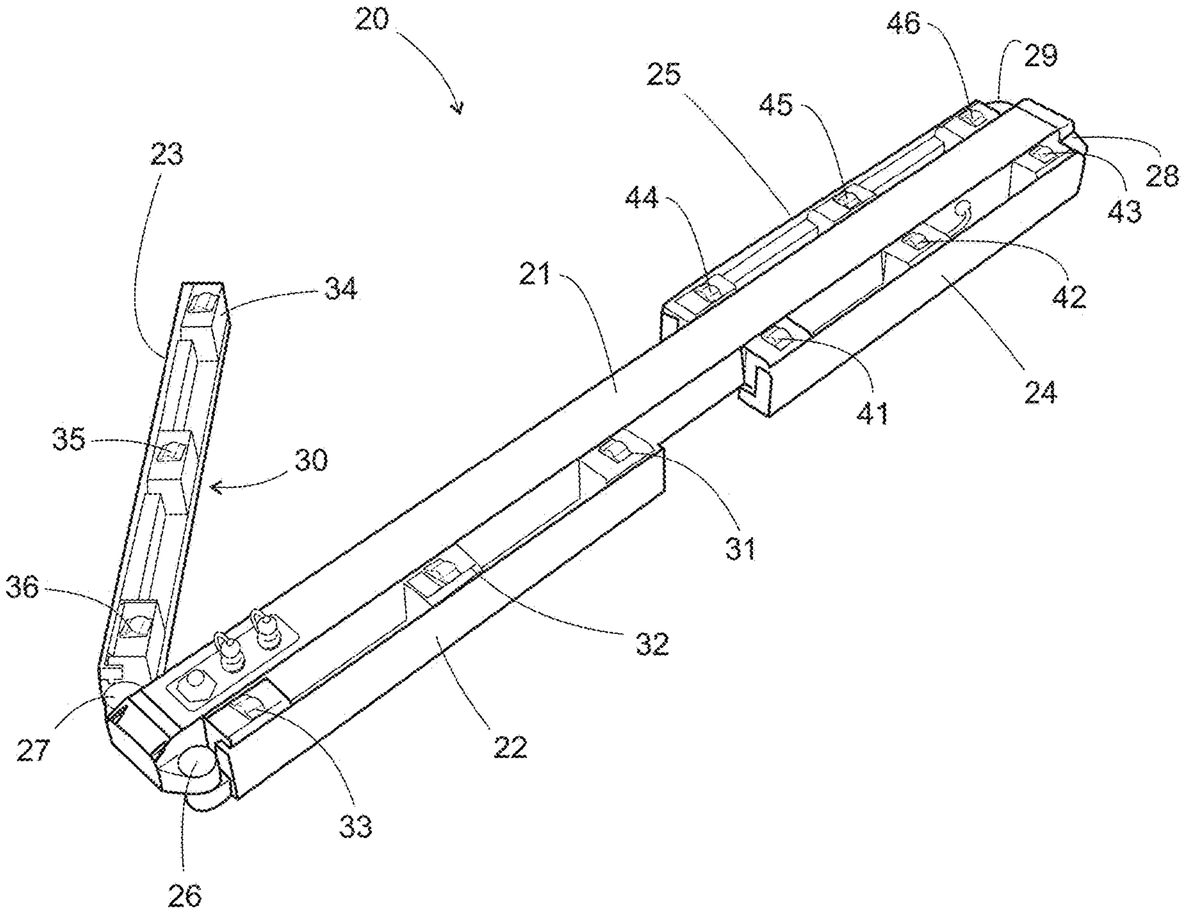
FIG. 1 is a diagram of a folded frame

As seen in FIG. 1, the folding frame 20 is designed to fold into a stick-like linear configuration in a folded mode. The folding frame 20 also has an unfolded mode where the socket arms are extended. The primary frame member 21 has two pairs of socket arms for a total of four socket arms: namely, a first left socket arm 22, a second left socket arm 23, a first right socket arm 24, and a second right socket arm 25. The socket arms have sockets 30 that receive lighting strips. The socket arms unfold to expose the sockets 30. The sockets 30 face the primary frame member 21 when the folding frame 20 is in the folded mode. When the folding frame 20 is in the deployed mode, the sockets 30 face each other and retain lighting strips between them.

The first left socket arm 22 has a first left distal socket 31, a first left middle socket 32, and a first left proximal socket 33. The second left socket arm 23 has a second left distal socket 34, a second left middle socket 35, and a second left proximal socket 36. The first right socket arm 24 has a first right distal socket 41, a first right middle socket 42, and a first right proximal socket 43. The second right socket arm 25 has a second right distal socket 44, a second right middle socket 45, and a second right proximal socket 46. When the socket arms are unfolded in the deployed mode, the second left distal socket 34 faces and aligns with the second right distal socket 44, the second left middle socket 35 faces and aligns with the second right middle socket 45, the second left proximal socket 36 faces and aligns with the second right proximal socket 46, the first left proximal socket 33 faces and aligns with the first right proximal socket 43, the first left middle socket 32 faces and aligns with the first right middle socket 42, and the first left distal socket 31 faces and aligns with the first right distal socket 41.

Figure 2:
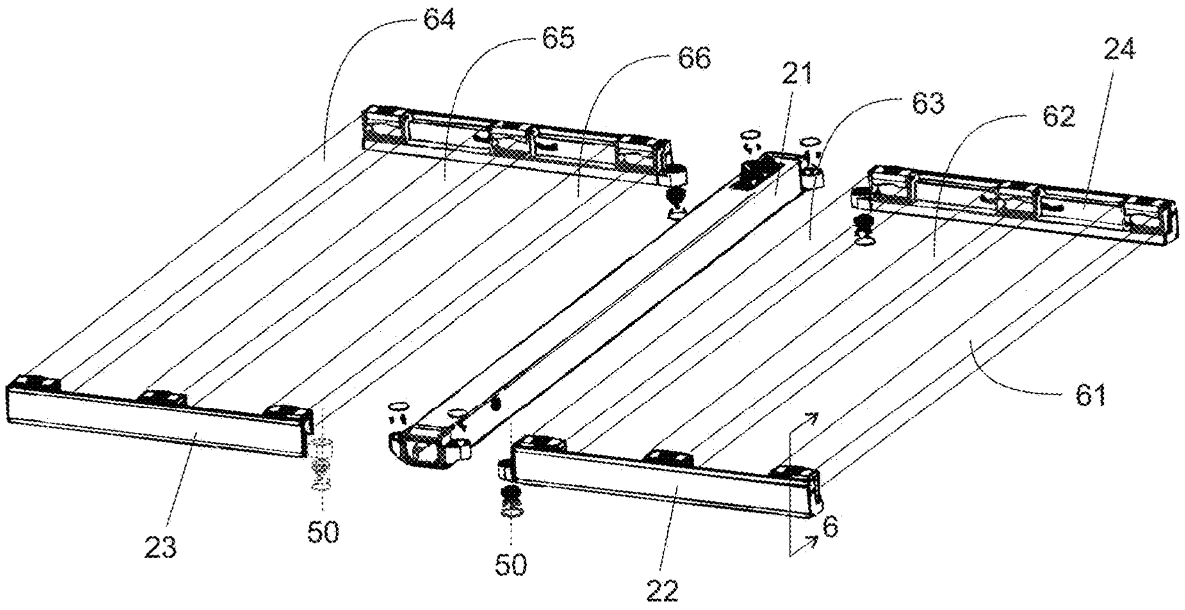
FIG. 2 is an exploded view diagram of an extended frame

As seen in FIG. 2, the frame folds from a linear configuration to an H-shaped frame. The first distal lighting strip 61 extends from the first left distal socket 31 to the first right distal socket 41. The first middle lighting strip 62 extends from the first left middle socket 32 to the first right middle socket 42. The first proximal lighting strip 63 extends from the first left proximal socket 33 to the first right proximal socket 43. The second distal lighting strip 64 extends from the second left distal socket 34 to the second right distal socket 44. The second middle lighting strip 65 extends from the second left middle socket 35 to the second right middle socket 45. The second proximal lighting strip 66 extends from the second left proximal socket 36 to the second right proximal socket 46.

Figure 3:
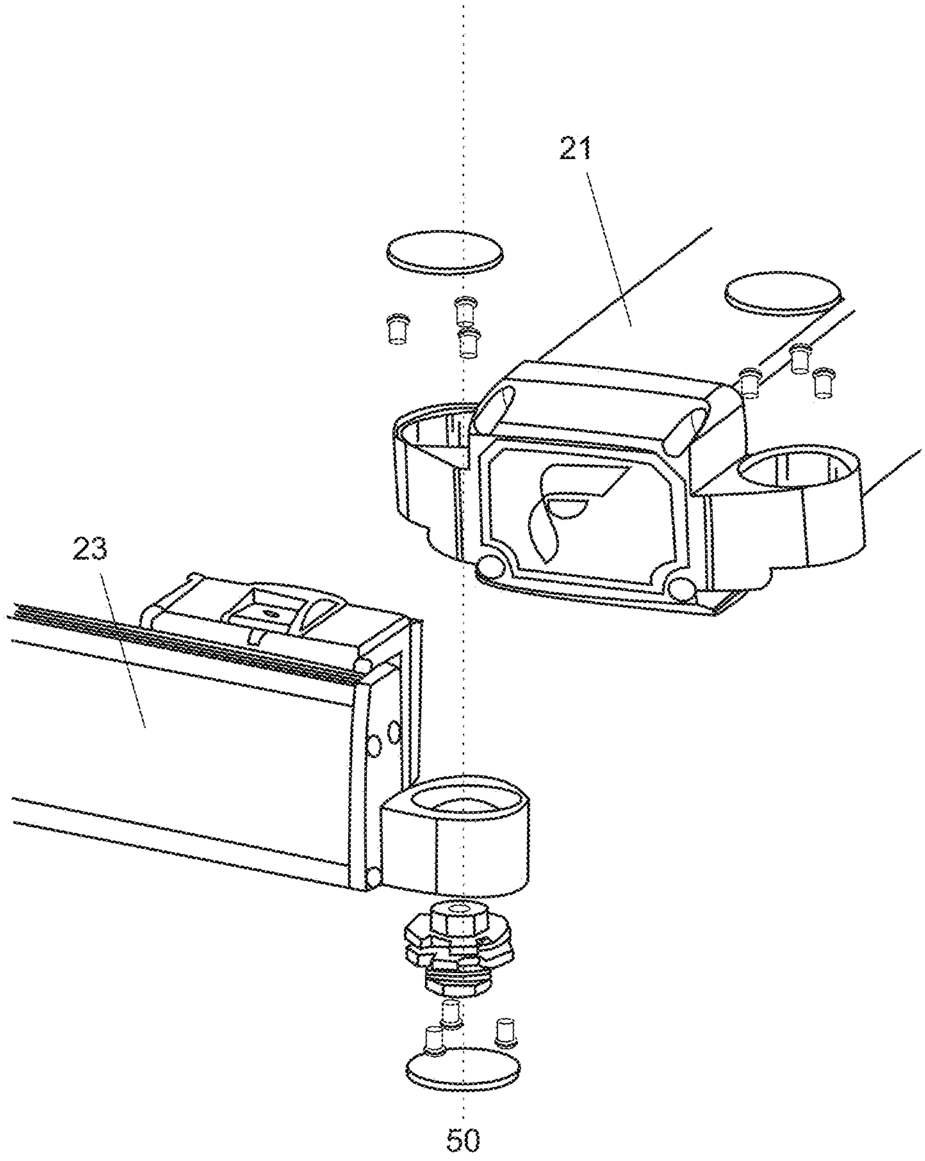
FIG. 3 is an exploded view diagram showing folding joints details.

As seen in FIG. 3, the primary frame member 21 connects to the second left socket arm 23 at an axis of rotation 50, where the socket arm can pivot. This rotating joint conducts electricity and passes electrical power from the primary frame member 21 into the second left socket arm 23.

Figure 4:
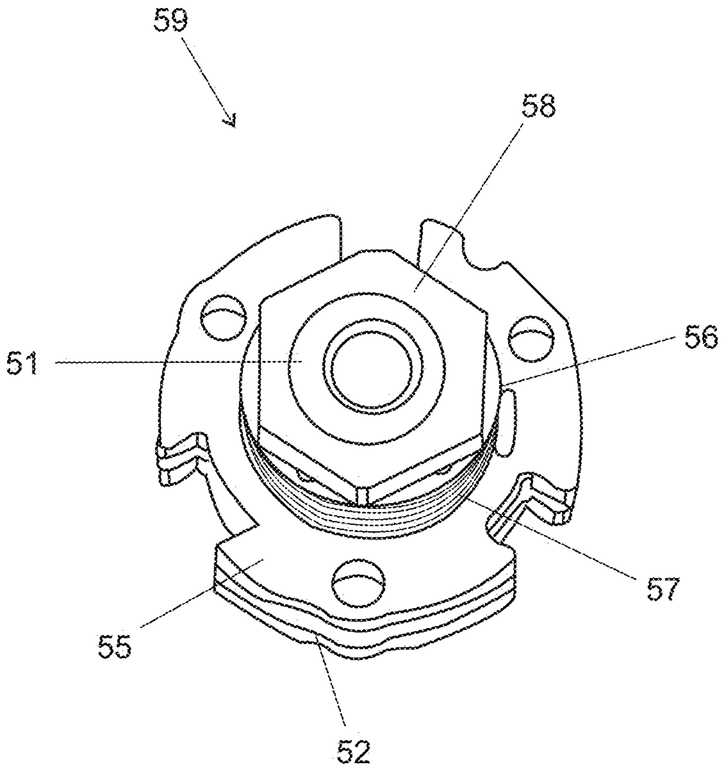
FIG. 4 is a diagram showing an electrical joint.
Figure 5:
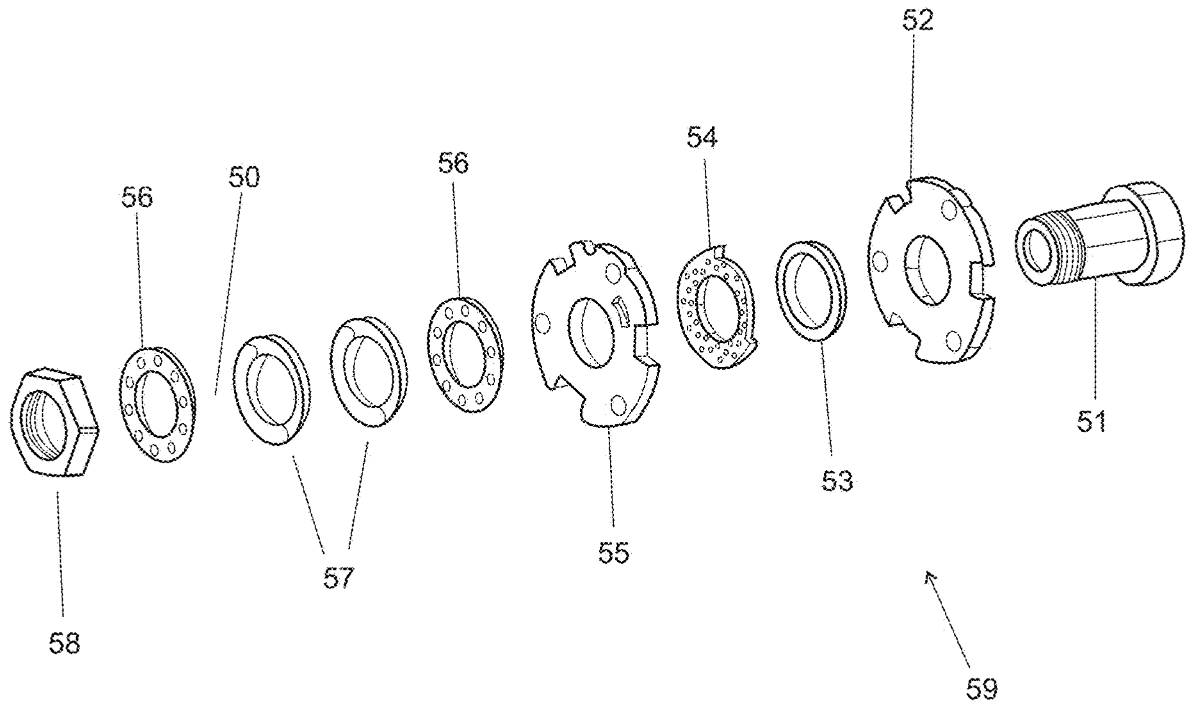
FIG. 5 is a diagram showing an exploded view of the electrical joint.

As seen in FIGS. 4 and 5, an electrical joint 59 provides the mechanical and electrical connection between the primary frame member 21 and the socket arm. The electrical joint 59 has a number of coaxial parts aligned along the axis of rotation 50. The joint includes a shaft core 51 configured as a bolt that receives a nut 58. A retainer bracket 52 is mounted to the shaft core 51. The retainer bracket 52 has a central opening that fits around the shaft core 51, and it also has peripheral slots. A shaft sleeve 53 is positioned as a gasket within the retainer bracket 52. A limit washer 54 has an arc-shaped slot that engages a movable bracket 55. The limit washer 54 defines a rotation angle limit for the movable bracket 55. The movable bracket 55 fits against the limit washer 54, which in turn fits against the shaft sleeve 53. A tightening washer 56 is formed by a pair of washers that sandwich a pair of spring washers 57. This tightening washer assembly is then secured with the nut 58. In this configuration, the movable bracket (attached to the electrically active portion of the socket arm or the primary frame member) conducts electricity to the retainer bracket 52, which is electrically connected to the other of the primary frame member or the socket arm. Thus, the retainer bracket 52 and the movable bracket 55 maintain electrical contact while allowing rotation and providing mechanical stability in the joint.

Figure 6:
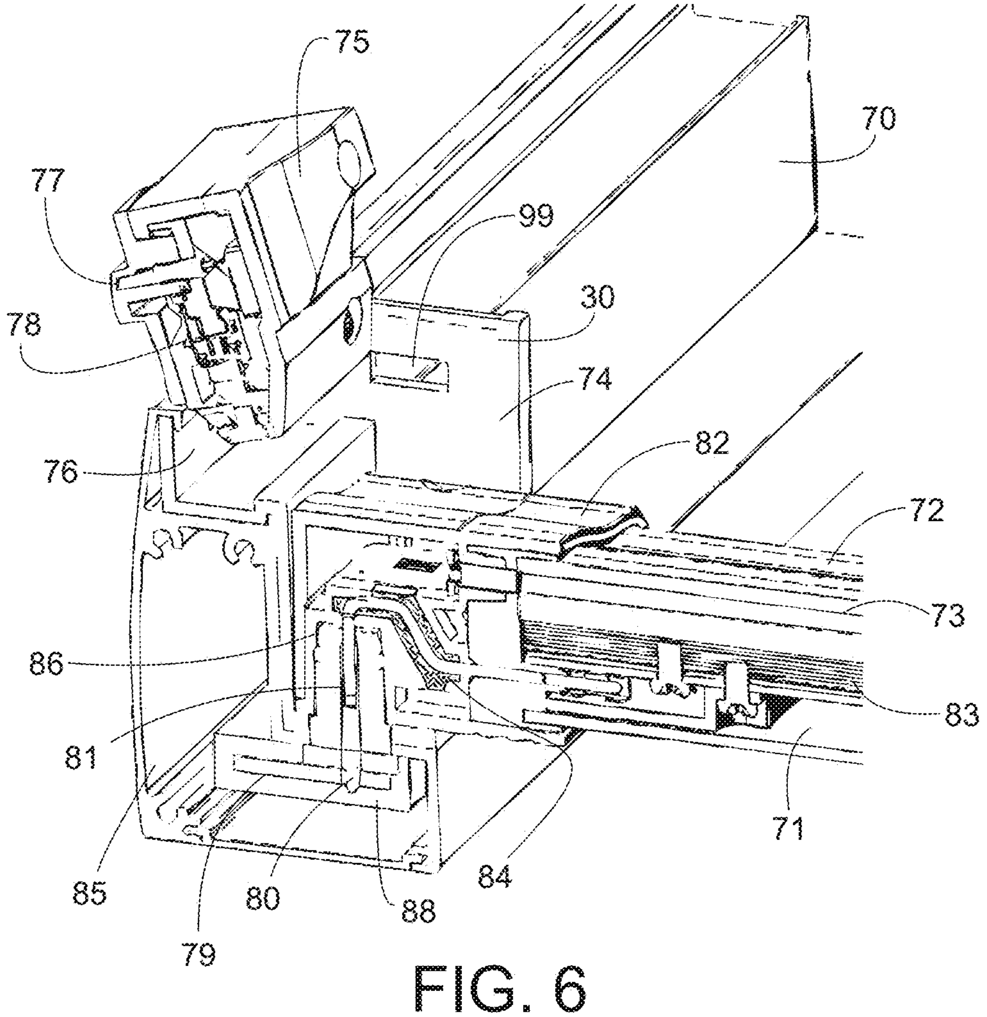
FIG. 6 is a cross-section diagram showing installation of an LED strip in a socket of a socket arm.

As seen in FIG. 6, the socket arm 70 includes a socket recess 74. Alighting strip 71 fits into the socket recess 74. The lighting strip 71 contains an LED 72 with a lens 73 over the LED. The LED is one of a series of LEDs arranged on an LED strip 83. The lighting strip 71 has a lighting strip socket connection end cap 82 covering each end of the lighting strip 71.

The socket recess 74 facilitates electrical connection between the socket arm 70 and the lighting strip 71. A latch 75 is provided to secure the lighting strip 71 in the socket recess 74. The latch 75 folds down over the socket recess 74 and retains the lighting strip socket connection end cap 82 in the recess. The latch 75 has a latch locker 77 that slides into a latch locker slot 99 formed on a sidewall of the socket recess 74. The latch locker 77 is biased to the closed position by a latch locker spring 78, which pushes the latch locker 77 into the latch locker slot 99. A user can pull back on the latch locker 77 (for example, via a handle on the latch locker 77) to disengage the latch locker 77 from the latch locker slot 99, allowing the latch 75 to open on its latch hinge 76. The socket recess 74 has a connector post 81 that fits into a connector post receiving socket 86 on the underside of the lighting strip 71. Thus, if the lamp is used outdoors, rain can drip down over the lighting strip 71 without interfering with the electrical wiring 84. The socket electrical connector 79 includes a socket pin connector receiver 80 that connects to a conductive element on a connector post base rail 88. The socket arm 70 features a base rail in a socket arm channel 85, and the connector post 81 is mounted on this connector post base rail 88 so that it makes electrical contact with the socket electrical connector 79. Because the connector post base rail 88 is linear and extends along the socket arm 70, the position of the socket 30 (and thus the lighting strip 71) can be adjusted along the length of the socket arm. To assemble the device, a user snaps the lighting strip 71 into the socket 30 and closes the latch 75, thereby making an electrical connection between the socket arm 70 and the lighting strip 71. The connector post 81 may have a connector post base 87 that locks into the connector post base rail 88 at any selected position along the socket arm channel 85. The connector post receiving socket 86 is preferably formed on the underside of the lighting strip 71 at the location of the lighting strip socket connection end cap 82.

Accordingly, the entire device can be quickly assembled and disassembled, allowing it to be moved between a compact folded (stowed) mode and a deployed mode for use. Once assembled in the deployed mode, the lamp frame forms a rigid structure. The structure is designed to be waterproof: key components can be coated in silicone, and the lens is a waterproof transparent plastic or glass that is sealed to the aluminum extrusion of the lighting strip 71. The socket arm channel 85 is also preferably formed from an aluminum extrusion. The assembly can be completed without the use of tools. Because the connector post 81 faces upwardly and is covered when engaged, the electrical connection is protected from falling water. Electrical conduction through the device is maintained by spring-biased contacts: for example, the socket pin connector is spring-biased against its receiver, and the rotating joint members in the electrical joint are biased against each other with spring pressure.

The invention claimed is:

1. A folding lamp, comprising:

a primary frame member extending along a longitudinal axis;

a plurality of socket arms pivotally attached to opposite sides of the primary frame member via electrical pivot joints, each socket arm pivoting between a folded position substantially parallel to the primary frame member and an unfolded position extending substantially perpendicular to the primary frame member;

elongated lighting strips removably secured between pairs of the socket arms when the socket arms are in the unfolded position;

at least one socket on each socket arm configured to removably receive an end of one of the lighting strips, each socket including an electrical connector supplying power to the respective lighting strip; and wherein each electrical pivot joint maintains an electrical connection while pivoting, thereby supplying power from the primary frame member to each lighting strip via the respective socket arms; wherein each socket arm includes a longitudinal connector rail, and each socket has an adjustable position along the connector rail; a connector post on each socket configured to slide within the connector rail for positional adjustment of the socket along the socket arm.

2. The folding lamp of claim 1, wherein each socket comprises a socket recess configured to receive and secure a lighting strip end via a latch mechanism.

3. The folding lamp of claim 2, wherein the latch mechanism includes a latch hinged to the socket arm and a spring-biased latch locker engaging a latch locker slot to secure the latch closed without tools.

4. The folding lamp of claim 1, wherein each socket arm is waterproof and comprises a silicone coating.

5. The folding lamp of claim 1, wherein each lighting strip includes an LED strip sealed by a transparent waterproof lens.

6. The folding lamp of claim 1, wherein the connector post includes a connector post base configured to frictionally engage within the connector rail to secure socket positioning.

7. A folding lamp, comprising:

a primary frame member extending along a longitudinal axis;

a plurality of socket arms pivotally attached to opposite sides of the primary frame member via electrical pivot joints, each socket arm pivoting between a folded position substantially parallel to the primary frame member and an unfolded position extending substantially perpendicular to the primary frame member;

elongated lighting strips removably secured between pairs of the socket arms when the socket arms are in the unfolded position;

at least one socket on each socket arm configured to removably receive an end of one of the lighting strips, each socket including an electrical connector supplying power to the respective lighting strip; and wherein each electrical pivot joint maintains an electrical connection while pivoting, thereby supplying power from the primary frame member to each lighting strip via the respective socket arms, wherein the electrical pivot joint comprises a shaft core, retainer bracket, movable bracket, and tightening elements assembled coaxially around an axis of rotation.

8. The folding lamp of claim 7, wherein the tightening elements include spring washers providing a biased electrical and mechanical connection between the retainer bracket and movable bracket.

9. The folding lamp of claim 7, further comprising a shaft sleeve positioned between the retainer bracket and movable bracket, providing a gasket seal.

10. The folding lamp of claim 7, further comprising a limit washer defining a rotation limit of the movable bracket relative to the retainer bracket.

11. The folding lamp of claim 7, wherein each socket electrical connector includes a spring-biased pin connector receiver.

12. The folding lamp of claim 7, wherein the lighting strips are oriented horizontally when the lamp is in the unfolded position.

13. The folding lamp of claim 7, wherein the socket arms form an H-shaped configuration when unfolded.

14. The folding lamp of claim 7, wherein each lighting strip end includes an end cap with a connector socket receiving a connector post extending from the socket.

15. The folding lamp of claim 7, wherein assembly and disassembly of the lamp can be performed without tools.

16. The folding lamp of claim 7, wherein the lighting strips and socket arms are made primarily of aluminum extrusions for durability and weight efficiency.

17. The folding lamp of claim 7, wherein the socket electrical connectors are covered and oriented upwardly to enhance waterproofing.

18. The folding lamp of claim 7, wherein the socket arms pivot upwardly from the folded position adjacent the primary frame member to the unfolded position.

* * * * *